3,519,356
RING LASER FLOW METER WITH MEANS TO COMPENSATE FOR CHANGES OF REFRACTIVE INDEX OF THE FLOWING MEDIUM
Robert D. Kroeger, Locust Valley, and Philippe M. Magdelain, Larchmont, N.Y., assignors to Sperry Rand Corporation, a corporation of Delaware
Filed Apr. 7, 1967, Ser. No. 629,235
Int. Cl. G01b *9/02;* G01p *5/00*
U.S. Cl. 356—106                                 5 Claims

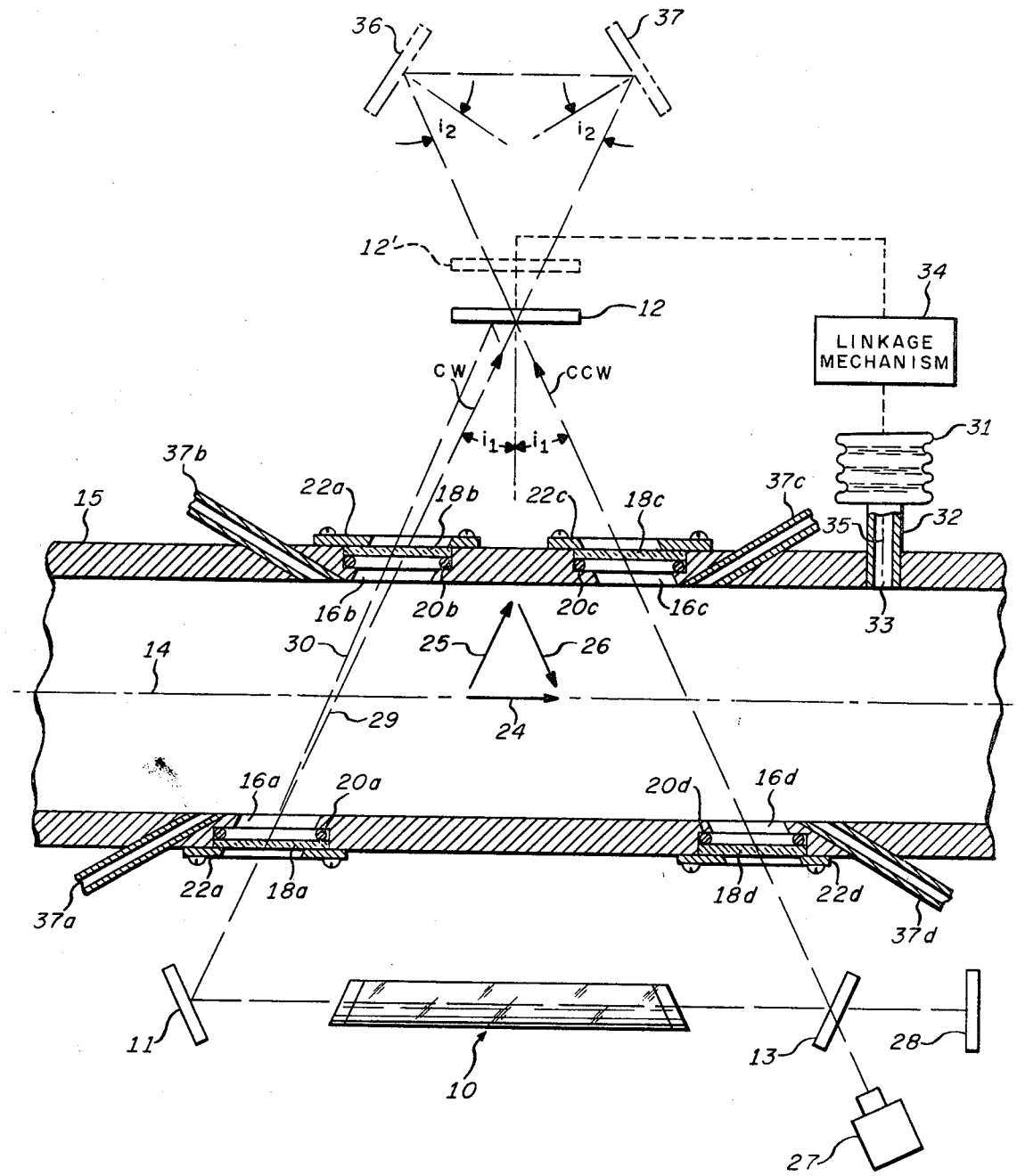

ABSTRACT OF THE DISCLOSURE

A ring laser flow meter oriented so that its contradirectional light waves traverse a fluid flow pipe in a direction non-orthogonal to the velocity vector of a fluid flowing therein and operating in conjunction with a pressure sensing servo for adjusting one or more of the laser cavity forming components in accordance with pressure variations of the flowing medium to compensate for optical misalignment caused by pressure induced refractive index variations of the fluid and further including auxiliary pipes connected to the flow pipe for introducing a high pressure, clean gas flow to preclude the accumulation of contaminants on the windows through which the contradirectional light beams enter and exit from the flow pipe.

BACKGROUND OF THE INVENTION

The present invention relates to ring lasers and more particularly to means for sustaining lasing action in ring laser flow meters.

A ring laser comprises reflective or refractive optical cavity forming components disposed relative to an active lasing medium such that light beams emitted from opposite ends thereof propagate in contradirectional circulatory paths, thereby enabling the optical cavity to support one or more oscillatory modes each consisting of two oppositely directed waves. Since the oppositely directed waves of a given mode oscillate at the same frequency when their circulatory paths lengths are equal and at different frequencies when their path lengths are unequal, the ring laser may be utilized as a flow meter based on the principles of the classical Fizeau effect wherein the phase velocity of light waves propagating through flowing water was observed to be affected by the motion of the water such that light waves propagating in the same direction as the flowing water and opposite thereto travelled faster and slower, respectively, than a light wave propagating in a stationary body of water. In the case of a ring laser flow meter the contradirection waves will be differentially affected simply by orienting the optical cavity so that at least part of the circulatory path lengths are aligned with the velocity vector of the flowing medium or a component thereof. With the cavity so oriented, the flowing medium effectively increases the circulatory path length for one beam and simultaneously decreases it by a similar amount for the oppositely directed beam, thus causing the contradirectional beams to oscillate at discrete frequencies having a difference proportional to the fluid flow rate. Inasmuch as the flow rate is measured by heterodyning the contradirectional light waves to obtain a beat frequency signal proportional to the difference in their frequencies, the lasing action must be continuous during the measuring period. The requirement for continuous lasing is generally satisfied once the optical cavity has been aligned provided the environmental factors remain fairly constant. If the flowing medium is a gas, however, which may flow under a wide range of pressures, changes in its refractive index relating to pressure variations, independent of environmental factors, may disrupt the optical alignment of the cavity sufficiently to cause a cessation of oscillation. In addition to or even in the absence of this limitation, if the gas contains contaminants that collect on the windows through which the light beams enter and exit from the flow pipe, the windows will tend to become opaque thus increasing the likelihood that lasing action will ultimately terminate.

SUMMARY OF THE INVENTION

The present invention overcomes the aforementioned limitations in a ring laser flow meter by providing means for sensing a variable characteristic such as the pressure of the flowing medium and adjusting the optical cavity to compensate for the misalignment resulting therefrom. In a preferred embodiment of the invention, used to measure the flow rate of a gas which may range in pressure from approximately 500 p.s.i. to 1,000 p.s.i., the cavity is initially aligned for some nominal pressure, say 750 p.s.i., and deviations from this pressure are measured by a bellows mechanism which translates two of the corner mirrors of a four-cornered laser flow meter so that the contradirectional waves propagate in closed loop paths irrespective of path deviations caused by pressure-induced refractive variations. In addition, to minimize attenuation of the light beams, means are provided for introducing a thin layer of high pressure, clean gas flow in the vicinity of the windows through which the light waves enter and exit from the flow pipe to prevent them from becoming clouded by oil or other particles suspended in the gas.

BRIEF DESCRIPTION OF THE DRAWING

For a more thorough understanding of the invention, reference should be made to the following detailed specification and the sole figure which depicts a preferred embodiment of the laser flow meter in a plan view taker across a diametral section of the flow pipe.

DESCRIPTION OF THE PREFERRED EMBODIMENT

Referring to the figure, the active lasing medium 10 pumped by a suitable source of energy emits cw and ccw light beams which are directed around contradirectional circulatory paths by highly reflective corner mirrors 11, 12 and 13. Although any continuous wave lasing medium may be used, the He-Ne system is preferred because of its superior temporal coherence in the present state of the art. The planar laser cavity is mounted on a support structure (not shown) and aligned parallel to and preferably coincident with a plane containing the longitudinal axis 14 of flow pipe 15 through which a flowing medium is transmitted. The contradirectional waves traverse the flow pipe by passing through apertures 16a, 16b, 16c and 16d which are covered respectively by optical windows 18a, 18b, 18c and 18d constructed of quartz, or other suitable material, transparent to the laser beam. For an application wherein the flow pipe conducts an explosive medium such as natural gas, the windows are cemented to O rings 20a, 20b, 20c and 20d to form a pressure tight seal and are held firmly in position by cover plates 22a, 22b, 22c and 22d screwed onto the flow pipe. Assuming that the fluid flows through pipe 15 in the direction indicated by arrow 24, a cw light beam which is aligned with components 25 and 26 of the fluid velocity vector propagates around the closed path in less time than it would if the fluid was stationary. The ccw beam, on the other hand, is directed opposite to the fluid velocity vector components 25 and 26 so that its travel time is increased. This difference in the closed loop travel time of the contradirectional beams is equivalent to a difference in their effective path lengths which causes them to oscillate at discrete frequencies. A measure of the frequency difference is obtained by extracting a part of the energy in each beam from the cavity by partial transmission through mirror 13 which is typically less than 1% transmissive. The portion of the cw beam transmitted through mirror 13 propagates directly to photodetector 27 while the extracted ccw component is reflected from mirror 28 back onto mirror 13 from which it is reflected in collinear relation with the cw beam onto the photodetector wherein the two beams mix to produce a beat frequency signal equal to the difference in their individual frequencies.

As explained above, the beat frequency is representative of the fluid flow rate so it is essential that lasing action be sustained continuously. When the fluid is under high pressure, however, it cannot be assumed that lasing will continues once it is established because variations of the fluid pressure are accompanied by refractive index changes which are of sufficient magnitude to misalign the laser cavity and cause a cessation of oscillation. For example, if the laser cavity is initially aligned for a particular fluid pressure and therafter the pressure increases the cw light beam upon entering the pipe at aperture 16a will be refracted along path 30 instead of its original path 29. The direction of propagation is altered at each interface between the fluid and optical windows with the result that the circulatory paths do not close on themselves. For simplicity of illustration, however, the path changes occurring at each fluid-window interface have not been shown. The present invention compensates for the optical misalignment by the provision of a pressure sensing mechanism comprising bellows 31 connected to tube 32 inserted in the flow pipe at aperture 33 which is preferably located downstream from the flow meter. When the fluid pressure changes, the linkage mechanism 34 responds to the expansion or contraction of the bellows along its longitudinal axis 35 and repositions mirror 12 so as to maintain alignment of the laser cavity. For instance, when the fluid presure increases causing the cw beam to follow path 30, mirror 12 is translated to the position indicated by 12' thus asuring that the circulatory path will close on itself. It should be readily apparent to those skilled in the art that other pressure sensing devices operating in conjunction with conventional servo componennts, such as motors or piezoelectric elements, may be used to control the position of the laser corner mirrors.

In an application where the invention is utilized to measure the flow rate of natural gas, the laser is preferably adjusted to oscillate at the .6328 micron line. Although the lines at 1.153 and 3.39 microns are stronger they are severely attenuated by the gas thus making it difficult to sustain oscillation even under conditions of perfect optical alignment.

Even for operation at .6328 micron it is considered advisable to incorporate other features in the flow meter to minimize laser cavity losses. For instance, the corner mirrors are oriented with respect to the apertures so that the contradirectional light beams impinge on the optical windows at Brewster's angle and the light beams are accordingly plane polarized parallel to the plane of the ring. In addition, mirror 12 is preferably replaced with the two dashed mirrors 36 and 37 arranged to operate in the manner of a single penta prism and affixed to a common mounting structure (not shown) which can be translated perpendicular to the longitudinal axis of the flow pipe to compensate for optical misalignment of the laser cavity. In this configuration the cw beam after reflecting from mirror 11 impinges successively on mirrors 37 and 36 and then on mirror 13. Likewise, the ccw beam after reflecting from mirror 13 impinges successively on mirrors 36 and 37 and then on mirror 11. Mirror 12 alone would be adequate if it was of metallic construction; but multilayer dielectric mirrors are required to obtain 99% minimum reflection as compared to approximately 95% for metallic mirrors. Multilayer dielectrics are sensitive, however, to angle of incidence, and in the present state of technology cannot be made to operate at the large angles of incidence $i_1$ but can operate at the smaller angles of incidence $i_2$. The difference in these angles becomes more apparent when the segment of the laser cavity between mirrors 11 and 13 is increased relative to the length of the other segments.

Attenuation of the contradirectional beams also results from particles suspended in the gas accumulating on the optical windows. In the present invention this problem is eliminated by the provision of auxiliary pipes 37a, 37b, 37c and 37d connected to the flow pipe in the vicinity of the optical windows. The free ends of these auxiliary pipes are connected to a supply of clean gas which has a pressure in excess of the gas pressure in the flow pipe to preclude back flow of gas from the flow pipe into the auxiliary pipes. The auxiliary pipes thus provide a high pressure clean gas flow which establishes a static layer of clean gas between each optical window and the natural gas in the flow pipe and thereby prevents opaque particles from collecting on the windows. The clean gas may be obtained from an independent supply or by drawing off part of the gas in the flow pipe and passing it through filtering and pressure boosting means.

While the invention has been described in its preferred embodiment, it is to be understood that the words which have been used are words of description rather than limitation and that changes within the purview of the appended claims may be made without departing from the true scope and spirit of the invention in its broader aspects.

What is claimed is:

1. In a ring laser flow measuring apparatus supporting at least one oscillatory mode consisting of two contradirectional waves propagating in circulatory paths and positioned such that the light waves traverse a flowing medium in a direction non-orthogonal to the velocity vector of the medium, a plurality of optical cavity forming components forming the ring laser optical cavity, means for maintaining closed loop propagation paths for the contradirectional waves irrespective of variations in the refractive index of the flowing medium, said means comprising, means for sensing changes in a characteristic of the flowing medium which induce a corresponding change in the refractive index thereof, and means responsive to the sensing means for adjusting the ring laser optical cavity to compensate for path deviations produced by the refractive index variations.

2. The apparatus of claim 1 wherein
   the sensing means is a pressure sensitive device, and
   the responsive means adjusts the laser cavity by moving an optical cavity forming component.

3. The apparatus of claim 1 and further including
   a flow pipe for transmission of the flowing medium, the plane of the laser cavity being disposed in a plane passing through the longitudinal axis of the flow pipe, the flow pipe having apertures therein through which the contradirectional waves enter and exit in order to traverse the pipe, and optical windows covering the apertures.

4. The apertures of claim 3 wherein the sensing means is a pressure sensitive device, and the responsive means adjust the laser cavity by translating an optical cavity forming component in a direction orthogonal to the longitudinal axis of the flow pipe.

5. The apparatus of claim 4 wherein the movable optical cavity forming element comprises two mirrors mounted on a common translatable fixture in a penta prism configuration.

References Cited

UNITED STATES PATENTS

| | | | |
|---|---|---|---|
| 2,650,562 | 9/1953 | Bonar et al. | 356—207 |
| 3,252,110 | 5/1966 | Gustafson et al. | 331—94.5 |
| 3,411,849 | 11/1968 | Aronowitz | 331—94.5 |

OTHER REFERENCES

"Electromagnetic Angular Rotation Sensing," Interim Engineering Report No. I., Sperry Report No. AB 1108–0016–I, September 1963, Contract No. AF 33(657)-11433 Task No. 442704, pp. (5–1)–(5–5) and FIG. (5–3) to FIG. (5–5).

RONALD L. WIBERT, Primary Examiner

V. P. McGRAW, Assistant Examiner

U.S. Cl. X.R.

73—194; 331—94.5